United States Patent
Napoletano

(10) Patent No.: US 8,831,291 B1
(45) Date of Patent: Sep. 9, 2014

(54) SYSTEM, METHOD, AND COMPUTER PROGRAM PRODUCT TO PROVIDE WIRELESS SENSING BASED ON AN AGGREGATE OPTICAL DETECTION

(71) Applicant: Lockheed Martin Corporation, Bethesda, MD (US)

(72) Inventor: Nathaniel Napoletano, Akron, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 68 days.

(21) Appl. No.: 13/732,931

(22) Filed: Jan. 2, 2013

(51) Int. Cl.
*G06K 9/00* (2006.01)
*G06T 7/20* (2006.01)

(52) U.S. Cl.
CPC .................................... *G06T 7/20* (2013.01)
USPC ........ 382/107; 359/204.5; 359/563; 340/945; 398/106

(58) Field of Classification Search
USPC .............. 340/945, 13.24, 619, 815.5, 815.54, 340/815.57; 398/106–114; 382/100, 107; 359/291, 204.5, 211.6, 217.4, 558, 563
See application file for complete search history.

(56) References Cited

U.S. PATENT DOCUMENTS

| | | | |
|---|---|---|---|
| 6,049,639 A | 4/2000 | Paniccia et al. | |
| 7,016,098 B2 * | 3/2006 | Giles et al. | 359/290 |
| 7,034,282 B2 | 4/2006 | Oka et al. | |
| 7,046,410 B2 * | 5/2006 | Deutsch et al. | 359/224.1 |
| 2004/0233485 A1 | 11/2004 | Moon et al. | |
| 2013/0090748 A1 * | 4/2013 | LaFrance et al. | 700/67 |

* cited by examiner

*Primary Examiner* — Shefali Goradia
(74) *Attorney, Agent, or Firm* — Terry M. Sanks, Esq.; Beusse Wolter Sanks & Maire, P.A.

(57) ABSTRACT

A system including a plurality of actuation devices with each individual actuation device configured to be manipulatable, a control panel, a plurality of diffraction gratings located on a back side of the control panel, each respective diffraction grating is configured to be in communication with at least one actuation device so that the respective diffraction grating is moved from a first position to at least one other position when the at least one actuation device is manipulated, a lighting device configured to illuminate the plurality of diffraction gratings, an imaging device configured to capture an image of the plurality of diffraction gratings, and a processor configured to convert the image into a discrete value, the discrete value being evaluated to determine which of the at least one actuation device is manipulated, how the manipulation reflects operation of the control panel, or to provide a response indicative of the manipulation.

20 Claims, 3 Drawing Sheets though the following detailed description contains many specifics for the purposes of illustration, anyone of ordinary skill in the art will appreciate that many variations and alterations to the following details are within the scope of the embodiments. Accordingly, the following embodiments are set forth without any loss of generality to, and without imposing limitations upon, any claims set forth. It is also to be understood that the terminology used herein is for the purpose of describing particular embodiments only, and is not intended to be limiting.

SYSTEM, METHOD, AND COMPUTER PROGRAM PRODUCT TO PROVIDE WIRELESS SENSING BASED ON AN AGGREGATE OPTICAL DETECTION

BACKGROUND

Embodiments relate generally to optical identification and, more particularly, to a system, method, and computer program product to provide wireless sensing using optical detection.

Training and/or simulation systems are used to assist in training users to operate a variety of complex electro-mechanical systems. For example, flight training is a field where training and/or simulation systems are used to assist in training pilots to operate aircraft. Training and/or simulation systems are also being used in a variety of other vast fields, including, but not limited to, operating of vehicular and/or marine systems, medical training, military combat training, etc.

Currently, many training and/or simulation systems are built utilizing equivalent electronic and mechanical components which are a part of the actual system that the training and/or simulation system is built to emulate. Under this approach, as actual systems become more complex, so too have the associated training and/or simulation systems. Additionally, to further create a more realistic environment of what a user experiences when using an actual system, very high fidelity trainers are being developed to further enhance learning with an immersive environment. With such systems not only will the user be able to train by operating controls in the training and/or simulation system, the user will also be able to visually see the effect of her/his decisions made.

By using the same or similar electronics as operational systems, current training and/or simulation systems also require similar wiring of components as the actual operational systems. Because of this requirement, the training and/or simulation systems are complex systems which prohibit them from being mobile and flexible enough to be readily disassembled and reassembled in a shortened period, such as within a few hours instead of days for transportation to the point-of-need. Furthermore, because of the current approach of having fully wired training and/or simulation systems, the cost for such systems is increasing as capabilities of actual systems are also increasing.

Thus, users and manufactures of training and/or simulation systems, including immersive human systems, would realize financial and operability benefit from having a technology which reduces expenses and improves an ability to build, assemble, and/or disassemble such systems by utilization of a wireless sensing technology to replace a use of wires or wiring harnesses between user actuated controls and corresponding subsystems.

BRIEF DESCRIPTION

Embodiments relate to a system, method, and computer software code to provide wireless sensing based on optical data acquired from an aggregate of devices or components. A system comprises a plurality of actuation devices, each actuation device of the plurality of actuation devices configured to be manipulatable, and a control panel. The system also comprises a plurality of diffraction, gratings located on a back side of the control panel, each respective diffraction grating is configured to be in communication with at least one actuation device of the plurality of actuation devices so that the respective diffraction grating is moved from a first position to at least one other position, representative of a manipulation, when the at least one actuation device is manipulated. The system further comprises a lighting device configured to illuminate the plurality of diffraction gratings, and an imaging device configured to capture an image of the plurality of diffraction gratings located on the back side of the control panel. The system also comprises a processor configured to convert the image into a discrete value, the discrete value are evaluated to determine which of the at least one actuation device is manipulated, how the manipulation reflects operation of the control panel, or to provide a response indicative of the manipulation.

The method comprises providing a plurality of actuation devices on a control panel, each actuation device is capable of being manipulated at a front end which moves a back end to which a diffraction grating is attached. The method also comprises actuating at least one actuation device of the plurality of actuation devices in response to a specific manipulation which causes the back end to move to a designated position indicative of the specific manipulation of the at least one actuation device. The method further comprises illuminating a plurality of the diffraction gratings, capturing an image of the plurality of diffraction gratings, and converting the image to a discrete value representative of positions of each actuation device of the plurality of actuation devices. The method also comprises determining, with a learning network and based on the discrete value, which of the at least one actuation device was manipulated, how the manipulation reflects operation of the control panel, or to provide a response indicative of the manipulation.

The computer software code causes the processor to illuminate, by activating an illumination device, a back side of a control panel, the control panel comprising a plurality of actuation devices which can be manipulated from a front side of the control panel and a plurality of diffraction gratings on the back side of the control panel with at least one diffraction grating of the plurality of diffraction gratings connected to at least one actuation device of the plurality of actuation devices. The computer software code also causes the processor to capture an image, by activating an imaging device, of the plurality of diffraction gratings located on the back side of the control panel, and convert the image into a discrete value representative of positions of each diffraction grating of the plurality of diffraction gratings. The computer software code also causes the processor to determine, with a learning network and based on the discrete value, which of the at least one actuation devices was manipulated, how the manipulation reflects operation of the control panel, or to provide a response indicative of the manipulation.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
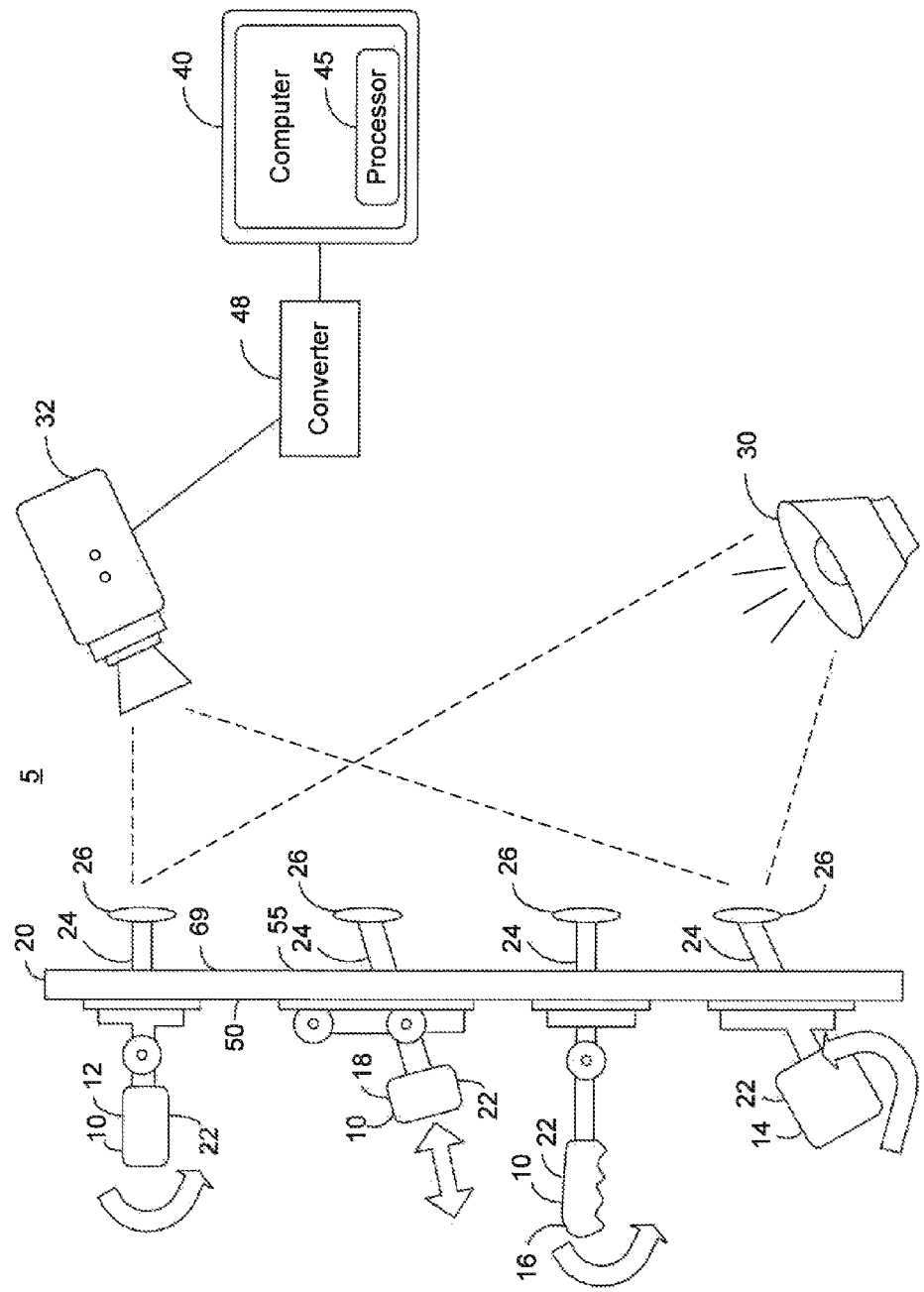
FIG. 1 shows an embodiment of a system providing wireless sensing based on aggregate optical detection.

Reference will be made below in detail to embodiments which are illustrated in the accompanying drawings. Wherever possible, the same reference numerals used throughout the drawings refer to the same or like parts. Broadly speaking, a technical effect is to provide wireless sensing (a form of communicating), using optical detection, where changes in an image representative of a complete set of instruments or actuation devices are evaluated to determine which of the instruments have been actuated or manipulated. To facilitate an understanding of embodiments, reference to specific implementations thereof is provided herein.

Though embodiments are disclosed herein with reference to the training and/or simulation systems (including immersive human systems), the embodiments are applicable with other devices or systems. As a non-limiting example, the embodiments may be utilized with other systems, such as, but not limited to, arcade or other gaming systems. Thus the descriptions regarding the embodiments provided herein which specifically discuss being used with training and/or simulation systems shall not be considered limiting. Furthermore, though the term "control panel" is used, this term is not intended to be limiting since actuation devices disclosed herein may be housed by any sort of housing device. Thus the term control panel is applicable to any sort of device used to house or hold any actuation device.

Referring now to the drawings, embodiments will be described. Embodiments can be implemented in numerous ways, including as a system (including a computer processing system), a method (including a computerized method), an apparatus, and/or with a non-transitory processor readable storage medium. Several embodiments are discussed below.

FIG. 1 shows an embodiment of a system 5 providing wireless communication based on aggregate optical detection. The system may include a plurality of different actuation devices 10. Such actuation devices 10 may comprise, but are not limited to, a switch 12, rotating (or rotatory) knob 14, lever 16 and/or push button 18. Each actuation device 10, when manipulated, such as but not limited to, by a user, may result in motion in a rear, or back side, of a control panel 20 that corresponds to actuation of the particular actuation device 10 at a front side of the control panel 20. More specifically, each actuation device 10 has a first end 22 (sometimes hereinafter referred to as "front end 22") or side which may be manipulated and a second end 24 (sometimes hereinafter referred to as "back end 24") or side which moves in accordance with the manipulation of the first end 22. The front end 22 of the actuation device 10 may be accessible and/or viewable by the user so that the user may manipulate it, whereas the back end 24 may not be viewable and/or accessible by the user. The type of movement realized may be of any sort, such as, but not limited to, front to back, side to side, circular, etc. A type of manipulation is non-limiting. As several non-limiting examples, manipulation may be caused by a user pulling the lever 16, rotating the knob 14, pushing the button 18, etc., and/or by automatic manipulation based caused by a processor 45 or computer 40 (such as a simulation host computer) in response to or as part of a simulated mission or training exercise. Though the computer 40 and processor 45 are illustrated as the processor 45 being a part of the computer 40, the processor 45 may be independent of the computer 40.

In an embodiment, the actuation devices 10 may be faux or dumb actuation devices, requiring no electrical wiring or electrical contact components. The faux or dumb actuation devices 10 may be moved in a manner similar to, identical to or a same manner as real actuation devices. However, the faux or dumb actuation devices 10, when actuated, may not provide any electrical signal, stimulus, or make an electrical connection or contact as the real actuation devices would provide.

In an embodiment, the system 5 may employ actuation devices 10 which may employ contactless switching. The system 5 may be configured to sense one, a set or an array of switch states of one, a set or an array of faux or dumb actuation devices.

In communication with the second end 24 of the actuation device 10 may be a diffraction grating material, component, and/or device 26 ("diffraction grating"). In addition to using the term "material," "component," and/or "device" herein, the term "diffraction grating" is also used to refer to the material, component and/or device. The diffraction grating 26 may be an optical component with a periodic structure, which splits and diffracts light into several beams travelling in different directions. The directions of these beams depend on the spacing of the grating and the wavelength of the light so that the grating acts as the dispersive element and color separator. The diffraction grating 26 may be an integral part of the back end 24 of the actuation device 10, as opposed to being attached to the back end 24.

As the second end 24 of the actuation device 10 is moved due to manipulation of the actuation device 10, a position of the diffraction grating 26 may be changed responsive to the manipulation. As a non-limiting example, if a switch 12 or lever 16 is the actuation device 10, when the switch 12 or lever 16 is moved to a certain position, the diffraction grating 26 may be moved, such as rotationally, to a specific position wherein the specific position is repeated each time the switch 12 or lever 16 is placed in the certain position in subsequent manipulations.

An illuminator 30 or illumination device, such as but not limited to, a light source, may be provided to illuminate the plurality of diffraction grating devices 26. When illuminated, a certain respective color, brightness, and/or reflective appearance may be given off based on a position of the diffraction grating 26 with respect to the light source and an imaging device 32. When the diffraction grating material 26 is moved, in response to the manipulation of the actuation device 10, the color, brightness and/or appearance may change.

The imaging device 32, such as, but not limited to, an optical motion camera, may be provided. The imaging device 32 may be used to monitor the changing light pattern reflected from the diffraction grating 26. The imaging device 32 may be configured to acquire an image at least as frequently as sixteen milliseconds (ms), though a faster rate (up to continuous acquisitions) may be desired depending on the intended purpose of the training and/or simulation system. The imaging device 32 may be located at a position so that it can obtain an image of a complete back side of the control panel 20, or more specifically all, or a plurality, of the diffraction gratings 26.

Thus, an image comprising an aggregate of all respective color, brightness, and/or overall appearance representing a respective position for each actuation device 10 may be obtained. Since the image is an aggregate of all respective colors, brightness, and/or overall appearance representing respective positions of each actuation device 10, it may be possible that because of the close proximity the actuation devices 10 are to one another, diffraction gratings 26 may also be in close proximity to adjacent diffraction gratings 26. As such, by way of a non-limiting example, a first color, brightness, and/or appearance illuminated from a first diffraction grating 26 may interact with a second color, brightness, and/ or appearance illuminated from a second diffraction grating 26 to produce a third color, varied degree of brightness, and/or appearance.

The movement or manipulation of any of the actuation devices 10 may be designed to cause an angle of the diffraction grating 26 to change with respect to the illuminator 30 and imaging device 32. Thus, the desired change in position of any of the actuation devices 10 may be interpreted by a change in brightness, color characteristics, and/or appearance from a signature associated with a particular actuation device 10 to designate manipulation.

The captured image may be communicated to a computer 40, more specifically at least one processor 45. The processor 45 may convert the image into a discrete value. Depending on the complexity of the image, more than one discrete value may represent the image. In another embodiment, a converter device 48 may be utilized. As used herein, the processor 45 may be considered to comprise the converter 48 or any subsystem or computer program which may convert a streaming image or still image into a discrete value. The discrete value may be evaluated, within the processor 45, to determine which of the plurality of actuation devices 10 are manipulated. The discrete value may also be used to determine how the manipulation (more specifically, which actuation devices were manipulated) reflects operation of the control panel, and hence the training and/or simulation system. The discrete value may also be used to provide a response indicative of the manipulation, such as notifying the user of information (such as, but not limited to, a display or audible notifier) and/or communicating to the simulation host computer 40 which may be integral to the training and/or simulation system. As explained above, the processor may be separate from the computer 40. Furthermore, the computer 40 which operates with the processor 45 may be distinct and separate from the simulation host computer 40. Therefore, the representation of computer 40 is not meant to be considering limiting with respect to signifying a single computer since a plurality of computers 40 may exist, each with independent or redundant functions.

In an embodiment, the plurality of actuation devices 10 may control one or more functions of a simulated vehicle, truck, aircraft or device.

The processor 45 may utilize a probabilistic model to analyze the discrete value to determine which one (or ones) actuation device of the plurality of actuation devices may be manipulated, how the manipulation reflects operation of the control panel 20, and/or to provide a response indicative of the manipulation. A non-limiting example of use of a probabilistic model may be a learning network 43, and by way of non-limiting example, a trainable Bayesian network to analyze the discrete value to determine which one (or ones) actuation device of the plurality of actuation devices may be, or may have been manipulated, how the manipulation reflects operation of the control panel, and/or to provide a response indicative of the manipulation. Another non-limiting example is a classifier neural network, namely a neural network which is used to infer a function from observations and able to use it. For simplification purposes only, learning network 43 may be used to represent the probabilistic model, the Bayesian network, and the classifier neural network.

The Bayesian network is a mathematical model that encodes probabilistic relationships among variables of interest. When used in conjunction with statistical techniques, the mathematical model has several advantages for data analysis since it can be used to predict and then learn. For example, once the model encodes dependencies among all variables, more specifically a plurality of reflective patterns taken from a plurality of images where different actuation devices 10 are manipulated, it may be capable of readily handling situations where some data entries are missing. Thus, the processor 45 may be able to determine a particular actuation device's setting when a reflective pattern is not determinative based on prior obtained images, where the images are based on their respective discrete values assigned. This can happen in a noisy environment created by light infiltration.

The Bayesian network may also be used to learn causal relationships, and hence can be used to gain understanding about operation of the training and/or simulation system and predict consequences of manipulation of at least one of the actuation devices. The Bayesian network may comprise both a causal semantic and a probabilistic semantic. Thus, it may be used to combine prior knowledge (former discrete values) and current discrete values to determine effects of manipulation of any one of the plurality of actuation devices, which in essence results in a learning network 43. Bayesian statistical methods may be used in conjunction with the Bayesian network to provide for an efficient and principled approach for learning how a manipulation affects the training and/or simulation system. Bayesian statistical topologies may also be hybridized with classifier neural network topologies creating a system that more accurately interprets the image data.

Figure 2:
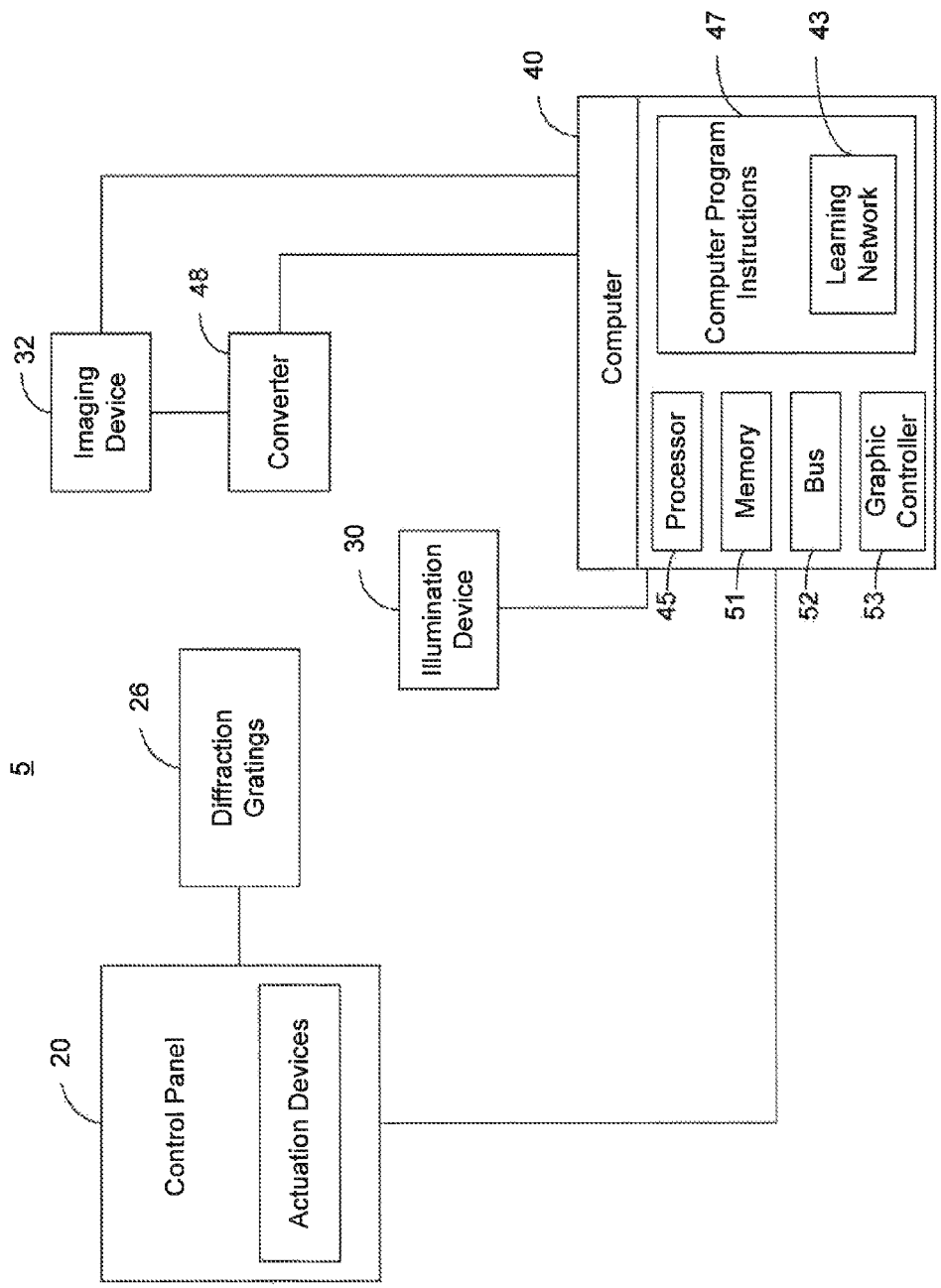
FIG. 2 shows a block diagram illustrating the system of an embodiment.

FIG. 2 shows a block diagram illustrating the system 5. As discussed above, the plurality of actuation devices 10 is provided. The control panel 20 may house the plurality of actuation devices 10. Each of the plurality of actuation devices 10 may be manipulatable from a front side 50 (illustrated in FIG. 1) of the control panel 20. The plurality of diffraction gratings 26 may be located on a back side 69 (illustrated in FIG. 1) of the control panel 20. As explained above with respect to FIG. 1, each respective diffraction grating 26 may be configured to be in communication with a respective actuation device 10 so that the respective diffraction grating 26 moves from a first position to at least one other position, representative of a specific manipulation, when the at least one actuation device 10 is manipulated. In other words, the other position may be a unique position associated with the manipulation performed.

To minimize the control panel 20 effecting a color, brightness and/or appearance of the diffraction gratings 26, the control panel 20 may be made of a composite and/or plastic material so as to have a non-reflective property. As a non-limiting example, the control panel 20 may be made utilizing three-dimensional (3D) printing technologies. In another embodiment a non-reflective covering 55 may be on, or is a part of, the back side 69 of the control panel 20. By completely eliminating or significantly reducing any reflectivity, information obtained or learned from the processor 45 may be integrated or downloaded into a processor 45 of other similar or same training and/or simulation systems, thus allowing what has been learned by the processor 45 from a prior training and/or simulation system to be applicable to other training and/or simulation systems with minimum additional training by the Bayesian network.

The imaging device 32 and illuminator 30 are located at positions with respect to the back side 69 of the control panel 20 to sufficiently illuminate the diffraction grating components 26 and to capture an image of all diffraction grating components 26 associated with each actuation device 10. Images taken by the imaging device may be forwarded to the computer 40 for conversion to a discrete value. The processor 45 may process the learning network 43. Based on the discrete value, the computer 40 and/or the processor 45 may be connected to the control panel 20 to communicate, such as to the user, which of the at least one actuation device 10 is manipulated, how the manipulation reflects operation of the control panel, and/or to provide a response indicative of the manipulation. The computer 40 may comprise other components that those skilled in the art would recognize as being a part of a computer system, such as, but not limited to, memory 51, a bus 52, graphics controller 53, etc. The learning network 43 (probabilistic model, Bayesian network, and/or classifier neural network) may be located within the computer program instructions 47.

Figure 3:
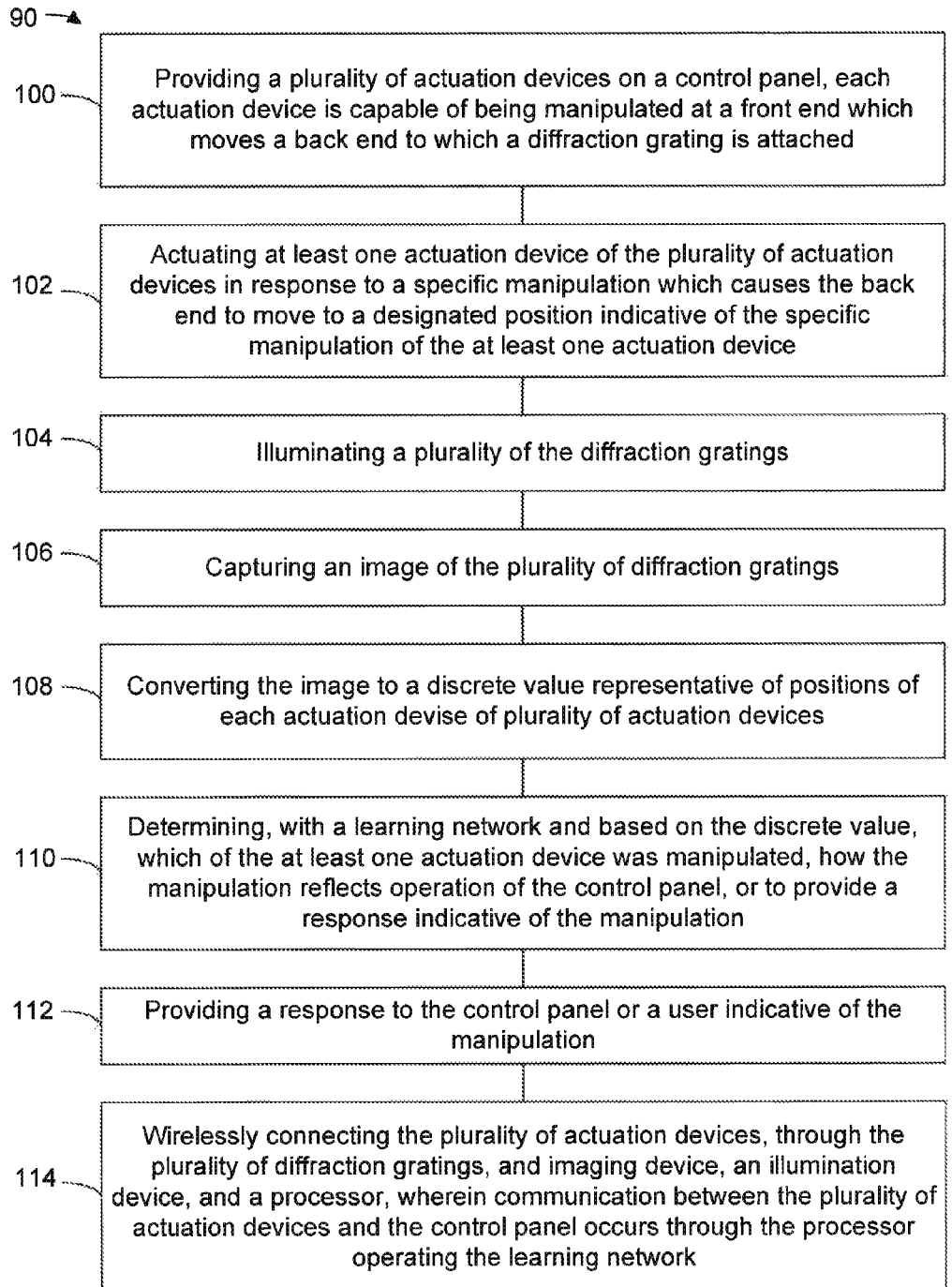
FIG. 3 shows a flowchart of a method of an embodiment.

FIG. 3 shows a flowchart of a method 90 of an embodiment. The method 90 comprises providing a plurality of actuation devices on a control panel, each actuation device is capable of being manipulated at a front end which moves a back end to which a diffraction grating is attached, at 100. The method 90 further comprises actuating at least one actuation device of the plurality of actuation devices in response to manipulation which causes the back end to move to a designated position indicative of a designated manipulation of the at least one actuation device, at 102. The step of actuating at least one actuation device causes the at least one diffraction grating attached to the at least on actuation device to reflect a color, brightness, or appearance that is unique to the position indicative of the manipulation of the at least one actuation device.

A step of illuminating the plurality of diffraction gratings, at 104, is also provided. Capturing an image of the plurality of diffraction gratings located on the back side of the control panel, at 106, is also provided. Capturing the image of the plurality may be performed at least as frequently as sixteen milliseconds. Capturing the image may further comprise capturing the image with the color, brightness, and/or appearance of each diffraction grating combined with the other diffraction gratings of the plurality of diffraction gratings to represent a specific designation for a manipulation state of each actuation device.

The method 90 also comprises converting the image to a discrete value representative of positions of each diffraction grating of the plurality of diffraction gratings, at 108, and determining, with a learning network and based on the discrete value, which one (or ones) actuation device of the plurality of actuation devices was (and/or is) manipulated, how the manipulation reflects operation of the control panel, and/or to provide a response indicative of the manipulation, at 110. The step of determining, with a learning network, may further comprise determining with a probabilistic model, a trainable Bayesian network, and/or a classifier neural network which of one (or ones) actuation device of the plurality of actuation devices was (and/or is) manipulated, how the manipulation reflects operation of the control panel, and/or to provide a response indicative of the manipulation.

The method 90 may further comprise providing a response to the control panel and/or a user indicative of the manipulation, at 112, or wirelessly connecting the plurality of actuation devices wherein communication between the plurality of actuation devices and the control panel occur through a processor operating the learning network at 114. As disclosed above, the wireless connection is accomplished using diffraction gratings 26, the illumination system 30, the imaging device 32, the processor 45, and the learning network (probabilistic model, the Bayesian network, and/or the classifier neural network).

Applying the embodiments disclosed herein would still allow for subsystems that may be tested prior to placing the subsystems into an operation system, such as but not limited to prior to finalizing integration into the operational system. As a non-limiting example, if a new avionics subsystem is developed for an aircraft, the avionics subsystem may be placed in a location reserved for the avionics subsystem on the training and/or simulation system. The avionics subsystem may function as intended within the training and/or simulation system, only the actuation devices would function as disclosed herein where the actuation devices would communicate to the avionics subsystem by first being communication through the optical detection subsystem disclosed herein (diffraction gratings, imaging device, processor, learning network (as a non-limiting example), etc.).

Persons skilled in the art will recognize that an apparatus, such as a data processing system, including a CPU, memory, I/O, program storage, a connecting bus, and other appropriate components, could be programmed or otherwise designed to facilitate the practice of embodiments of the method. Such a system would include appropriate program means for executing the method. Also, an article of manufacture, such as a pre-recorded disk, computer readable media, or other similar computer program product, for use with a data processing system, could include a storage medium and program means recorded thereon for directing the data processing system to facilitate the practice of the method.

Embodiments may also be described in the general context of computer-executable instructions, such as program modules, being executed by any device such as, but not limited to, a computer, designed to accept data, perform prescribed mathematical and/or logical operations usually at high speed, where results of such operations may or may not be displayed. Generally, program modules include routines, programs, objects, components, data structures, etc., that perform particular tasks or implement particular abstract data types. In an embodiment, the software programs that underlie embodiments can be coded in different programming languages, for use with different devices, or platforms. It will be appreciated, however, that the principles that underlie the embodiments can be implemented with other types of computer software technologies as well.

Moreover, those skilled in the art will appreciate that the embodiments may be practiced with other computer system configurations, multiprocessor systems, microprocessor-based or programmable consumer electronics, minicomputers, mainframe computers, and the like. Embodiments may also be practiced in distributed computing environments where tasks are performed by processing devices located at different locations on board of a vehicle or stationary device, that are linked through at least one communication network. In a distributed computing environment, program modules may be located in both local and remote computer storage media including memory storage devices.

In view of the above, a non-transitory processor readable storage medium is provided. The storage medium comprises an executable computer program product which further comprises a computer software code that, when executed on a processor, causes the processor to illuminate, by activating an illumination device, a back side of a control panel, the control panel comprising a plurality of actuation devices which can be manipulated from a front side of the control panel and a plurality of diffraction gratings on the back side of the control panel with at least one diffraction grating of the plurality of diffraction gratings connected to at least one actuation device of the plurality of actuation devices, capture an image, by activating an imaging device, of the plurality of diffraction gratings located on the back side of the control panel, convert the image into a discrete value representative of positions of each diffraction grating of the plurality of diffraction gratings, and determine, with a learning network and the discrete value, which of the at least one actuation devices is (and/or was) manipulated, how the manipulation reflects operation of the control panel, and/or to provide a response indicative of the manipulation.

Thus, based on the embodiments disclosed herein, a system and method are provided for interrogating controls, identified as actuation devices, on a control panel as a mass operation where the need for panel wiring is reduced or eliminated. The interrogation is accomplished based on an optical signature realized from coloration and luminosity reflected from diffraction gratings that are moved based on manipulation of the controls. The optical signature is captured and converted into a discrete value that is analyzed with a processor employing a process, such as, but not limited to, learning network, to ascertain which control or controls is (and/or has been) manipulated.

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered. Moreover, unless specifically stated, any use of the terms first, second, etc., does not denote any order or importance, but rather the terms first, second, etc., are used to distinguish one element from another. Furthermore, the use of past or present tenses may be used interchangeably and should not be considered as limiting.

What is claimed is:

1. A system comprising:
    a plurality of actuation devices, each actuation device of the plurality of actuation devices configured to be manipulatable;
    a control panel;
    a plurality of diffraction gratings located on a back side of the control panel, each respective diffraction grating is configured to be in communication with at least one actuation device of the plurality of actuation devices so that the respective diffraction grating is moved from a first position to at least one other position, representative of a manipulation, when the at least one actuation device is manipulated;
    a lighting device configured to illuminate the plurality of diffraction gratings;
    an imaging device configured to capture an image of the plurality of diffraction gratings located on the back side of the control panel; and
    a processor configured to convert the image into a discrete value, the discrete value are evaluated to determine which of the at least one actuation device is manipulated, how the manipulation reflects operation of the control panel, or to provide a response indicative of the manipulation.

2. The system according to claim 1, wherein the image captured comprises each of the diffraction gratings reflecting a color, brightness, or appearance which is combined with the other diffraction gratings of the plurality of diffraction gratings to represent a specific designation for a manipulation state of each actuation device.

3. The system according to claim 1, wherein at least one actuation device of the plurality of actuation devices is a faux actuation device which provides no electrical signal when manipulated and is further configured to be moved in a same manner as an actuation device which provides an electrical signal when manipulated.

4. The system according to claim 1, wherein the imaging device is configured to capture the image of the plurality of diffraction gratings at least as frequently as sixteen milliseconds.

5. The system according to claim 1, wherein a response indicative of the manipulation is communicated from the processor to the at least one of the actuation device or to a device which notifies a user of the response.

6. The system according to claim 1, wherein the control panel has a non-reflective back side.

7. The system according to claim 1, wherein the processor utilizes a learning network to analyze the discrete value to determine which of the at least one actuation device is manipulated, how the manipulation reflects operation of the control panel, or to provide a response indicative of the manipulation.

8. The system according to claim 1, wherein the processor utilizes a probabilistic model, a trainable Bayesian network or a classifier neural network to analyze the discrete value to determine which of the at least one actuation device is manipulated, how the manipulation reflects operation of the control panel, or to provide a response indicative of the manipulation.

9. The system according to claim 1, wherein the plurality of actuation devices are wirelessly connected to the control panel wherein communication between the plurality of actuation devices and the control panel occur through the processor in response to the captured image of the plurality of diffraction gratings.

10. A method comprising:
    providing a plurality of actuation devices on a control panel, each actuation device is capable of being manipulated at a front end which moves a back end to which a diffraction grating is attached;
    actuating at least one actuation device of the plurality of actuation devices in response to a specific manipulation which causes the back end to move to a designated position indicative of the specific manipulation of the at least one actuation device;
    illuminating a plurality of the diffraction gratings;
    capturing an image of the plurality of diffraction gratings;
    converting the image to a discrete value representative of positions of each actuation device of the plurality of actuation devices; and
    determining, with a learning network and based on the discrete value, which of the at least one actuation device was manipulated, how the manipulation reflects operation of the control panel, or to provide a response indicative of the manipulation.

11. The method according to claim 10, further comprising providing a response to the control panel or a user indicative of the manipulation.

12. The method according to claim 10, wherein actuating at least one actuation device causes the at least one diffraction grating attached to the at least on actuation device to reflect a color, brightness, or appearance that is unique to the position indicative of the manipulation of the at least one actuation device.

13. The method according to claim 12, wherein capturing the image further comprises capturing color, brightness, or appearance of the plurality of diffraction gratings.

14. The method according to claim 10, wherein capturing the image of the plurality of diffraction gratings occurs at least as frequently as sixteen milliseconds.

15. The method according to claim 10, further comprising wirelessly connecting the plurality of actuation devices through the plurality of diffraction gratings, an imaging device, an illumination device, and a processor wherein communication between the plurality of actuation devices and the control panel occurs through the processor operating the learning network.

16. The method according to claim 10, wherein the step of determining, with a learning network, further comprises determining with a probabilistic model, a trainable Bayesian network or a classifier neural network which of the at least one actuation device was manipulated, how the manipulation reflects operation of the control panel, or to provide a response indicative of the manipulation.

17. A non-transitory processor readable storage medium, providing an executable computer program product, the executable computer program product comprising a computer software code that, when executed on a processor, causes the processor to:
   illuminate, by activating an illumination device, a back side of a control panel, the control panel comprising a plurality of actuation devices which can be manipulated from a front side of the control panel and a plurality of diffraction gratings on the back side of the control panel with at least one diffraction grating of the plurality of diffraction gratings connected to at least one actuation device of the plurality of actuation devices;
   capture an image, by activating an imaging device, of the plurality of diffraction gratings located on the back side of the control panel;
   convert the image into a discrete value representative of positions of each diffraction grating of the plurality of diffraction gratings;
   determine, with a learning network and based on the discrete value, which of the at least one actuation device was manipulated, how the manipulation reflects operation of the control panel, or to provide a response indicative of the manipulation.

18. The processor readable storage medium according to claim 17, further comprising the processor to provide a response to the control panel or a user indicative of the manipulation.

19. The processor readable storage medium according to claim 17, wherein the processor to capture the image further comprises the processor to capture a reflected color, brightness or appearance representative of a location of each diffraction grating of the plurality of diffraction gratings to identify movement of the at least one diffraction grating that is specific to a certain manipulation of the at least one actuation device.

20. The processor readable storage medium according to claim 17, wherein the processor to determine, with a learning network, further comprises the processor to determine with a probabilistic model, a trainable Bayesian network, or a classifier neural network which of the at least one actuation devices was manipulated, how the manipulation reflects operation of the control panel, or to provide a response indicative of the manipulation.

* * * * *